(12) United States Patent
Hsieh et al.

(10) Patent No.: US 7,782,868 B2
(45) Date of Patent: Aug. 24, 2010

(54) TWO-STAGE COMPUTER NETWORK PACKET CLASSIFICATION METHOD AND SYSTEM

(75) Inventors: Chang-Chih Hsieh, Taipei (TW); Sheng-De Wang, Taipei (TW)

(73) Assignee: National Taiwan University, Taipei (TW)

( * ) Notice: Subject to any disclaimer, the term of this patent is extended or adjusted under 35 U.S.C. 154(b) by 208 days.

(21) Appl. No.: 12/163,007

(22) Filed: Jun. 27, 2008

(65) Prior Publication Data

US 2009/0190592 A1 Jul. 30, 2009

(30) Foreign Application Priority Data

Jan. 25, 2008 (TW) ............................... 97102785 A

(51) Int. Cl.
H04L 12/28 (2006.01)
(52) U.S. Cl. .......................... 370/395.32; 370/395.31; 370/389; 370/392; 370/466; 370/474
(58) Field of Classification Search .................. 370/254, 370/351–356, 389, 390, 392, 393, 395.31, 370/395.32, 395.7, 395.71–72, 400, 401, 370/408, 466, 474, 395.72
See application file for complete search history.

(56) References Cited

U.S. PATENT DOCUMENTS

| | | | | |
|---|---|---|---|---|
| 6,449,256 | B1 * | 9/2002 | Varghese et al. | 370/238 |
| 7,116,663 | B2 * | 10/2006 | Liao | 370/392 |
| 7,296,113 | B2 * | 11/2007 | Somasundaram | 711/108 |
| 7,313,667 | B1 * | 12/2007 | Pullela et al. | 711/202 |
| 7,408,932 | B2 * | 8/2008 | Kounavis et al. | 370/392 |
| 7,474,657 | B2 * | 1/2009 | Sahni et al. | 370/392 |

OTHER PUBLICATIONS

Baboescu, Florin, et al. "Scalable Packet Classification", 2005, 2-14, vol. 13(1), IEEE Press, Piscataway, NJ, USA.
Li, Ji, et al. "Scalable Packet Classification Using Bit Vector Aggregating and Folding", 2006,139-144, PARALEC, International Symposium on Parallel Computing in Electrical Engineering, Cambridge, MA, USA.

(Continued)

Primary Examiner—Pankaj Kumar
Assistant Examiner—Mark A Mais
(74) Attorney, Agent, or Firm—Pearne & Gordon LLP

(57) ABSTRACT

A two-stage computer network packet classification method and system is proposed, which is designed for integration to a network system for classification of packets within the network system. The proposed method and system is characterized by the use of a two-stage operation for packet classification; wherein the first-stage operation involves the use of a decision-tree data module whose leaf nodes are used to store a bit vector that represents a cluster of rule groups that are located within a particular cut region in a multidimensional Euclidean space that is mapped to the field values of the input packet; and the second-stage operation involves the use of a bit-vector lookup table data module to retrieve a set of bit vectors which represent a set of possible rules in each rule group and which are intersected to find a matched rule for the input packet. This feature allows the packet classification to be implemented with low memory requirement and enhanced system performance.

22 Claims, 11 Drawing Sheets

OTHER PUBLICATIONS

Srinivasan, T., et al. "Scalable and Parallel Aggregated Bit Vector Packet Classification Using Prefix Computation Model", 2006, 139-144, IEEE Computer Society Washington, DC, USA.

Gupta, P. et al. "Packet Classification using Hierarchical Intelligent Cuttings", Feb. 2000, 34-41, vol. 20(1), ACM New York, NY, USA.

Woo, T.Y.C., "A Modular Approach to Packet Classification: Algorithm and Result", Mar. 2000, 1213-1222, vol. 3, INFOCOM, Bell Labs., Lucent Technol., USA.

* cited by examiner

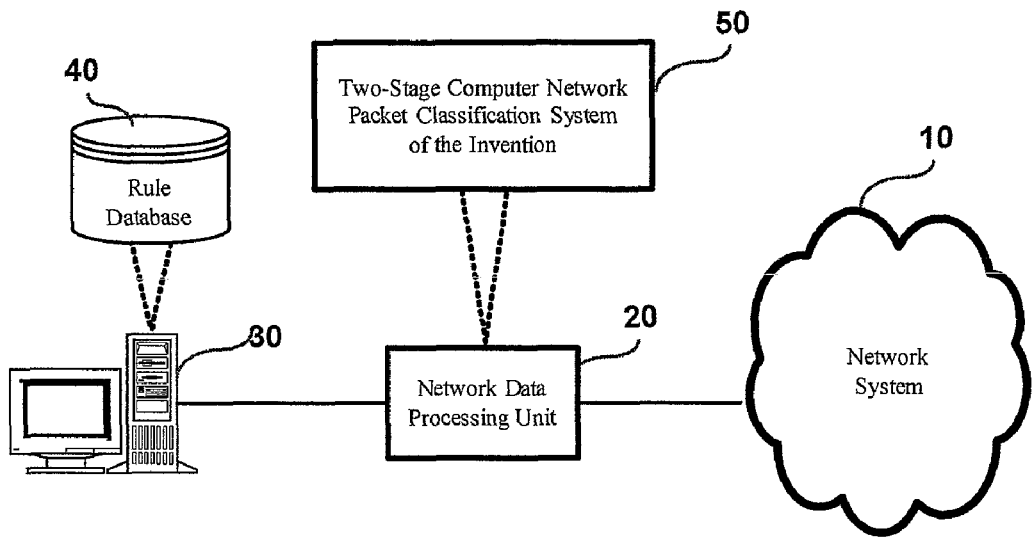
FIG. 1
| | Field 1 | Field 2 | Field 3 | Field 4 |
|---|---|---|---|---|
| Rule | Source IP Address | Destination IP Address | Source Port | Destination Port |
| R(0) | xxxx | xxxx | xxxx | xxxx |
| R(1) | xxxx | xxxx | xxxx | xxxx |
| R(2) | xxxx | xxxx | xxxx | xxxx |
| : | : | : | : | : |
| : | : | : | : | : |
| R(N-1) | xxxx | xxxx | xxxx | xxxx |
40
FIG. 2
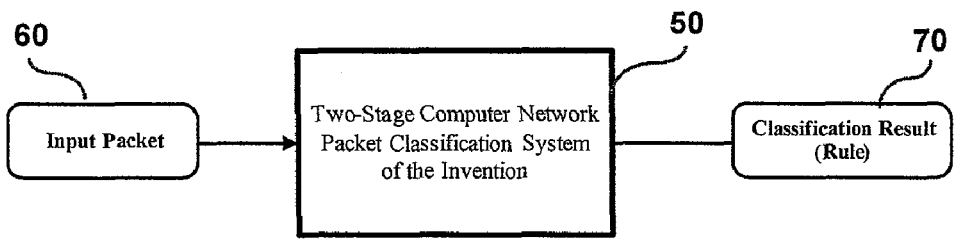
FIG. 3

| RULE | FIELD-1 (X) | FIELD-2 (Y) |
|---|---|---|
| R(0) | [000*] | [0:2] |
| R(1) | [001*] | [1:1] |
| R(2) | [0010] | [6:10] |
| R(3) | [*] | [5:5] |
| R(4) | [01**] | [8:8] |
| R(5) | [0110] | [3:3] |
| R(6) | [0111] | [10:10] |
| R(7) | [1000] | [2:2] |
| R(8) | [1***] | [8:15] |
| R(9) | [110*] | [4:4] |
| R(10) | [1100] | [2:2] |
| R(11) | [1110] | [3:3] |
| R(12) | [01**] | [0:1] |

TWO-STAGE COMPUTER NETWORK PACKET CLASSIFICATION METHOD AND SYSTEM

BACKGROUND OF THE INVENTION

1. Field of the Invention

This invention relates to computer network technology, and more particularly, to a two-stage computer network packet classification method and system which is designed for integration to a network system for classification of packets transmitted and received over the network system.

2. Description of Related Art

Packet classification is an important function of network systems for applications such as firewalls and intrusion detection, policy-based routing, and network service differentiations, for use to identify the attributes of all incoming packets based on their headers. When a networking device, such as an enterprise-class server or router, receives an incoming packet, the first step is to determine the type of the packet, such as what protocol is being used by the packet, what ToS (Type of Service) or QoS (Quality of Service) is to be assigned to the packet, the source and destination of the packet (which might be used to indicate, for example, whether the packet is coming from a malignant source), to name just a few.

In actual implementation, packet classification is realized by using a user-predefined rule database which specifies the mapping of predefined field values in the packet header to a set of rules, each rule representing a particular type of action or service that is to be performed on the packet. For example, if the source IP address of an incoming packet is matched to a rule that specifies an unauthorized IP address, the action to be performed on the incoming packet might be to discard the packet or to trace back to its originating source.

Typically, the total number of rules in a rule database might be in the range from several dozens to several thousands. Therefore, the hardware/software implementation of packet classification typically requires a huge amount of memory space for storage of the rule database and also requires a significant amount of access time to search through the rule database for matched rules. This drawback causes the implementation of packet classification to have low system performance.

In view of the aforementioned problem, it has been a research and development effort in the computer network industry for solutions that can implement the packet classification with reduced memory space and enhanced processing speed. Some research results have been disclosed in the following technical papers: [1] *"Packet classification using hierarchical intelligent cuttings"* authored by P. Gupta et al and published on IEEE Micro, vol. 20, no. 1, pp. 34-41, February 2000; [2] *"Scalable Packet Classification"* authored by Florin Baboescu et al and published on IEEE/ACM Transactions on networking, vol. 12, Issue 1, pp. 2-14, February 2005; and [3] *"A modular approach to packet classification: algorithm and result"* authored by T. Y. C. Woo and published on Proc. IEEE Infocom, vol. 3, pp. 1213-1222, March 2000; to name just a few. These papers teach the use of a so-called "decision tree" for finding a corresponding rule from the rule database for the input packet. One drawback to the use of the conventional decision tree, however, is that it requires a very large data amount for implementation, and thus needs a large amount of memory space for storage, which results in a low system performance.

SUMMARY OF THE INVENTION

It is therefore an objective of this invention to provide a two-stage computer network packet classification method and system which allows the packet classification to be implemented with low memory requirement and enhanced system performance.

The two-stage computer network packet classification method and system according to the invention is designed for integration to a network system, such as the Internet, an intranet system, an extranet system, and a LAN (Local Area Network) system, for classification of packets transmitted and received over the network system.

The two-stage computer network packet classification method and system according to the invention includes two stages of operations for packet classification.

The first stage of operation is based on a decision-tree data module which is a static data store module for defining a decision tree data structure, wherein the decision tree data structure includes one root node and a plurality of leaf nodes linked to the root node, and wherein the decision tree data structure is established by mapping the field-to-rule correspondence defined in the rule database onto an N-dimensional Euclidean space, and using a predefined Euclidean space cutting scheme to cut each classification-related header field into a number of segments which are mapped to the N-dimensional Euclidean space to define a number of cut regions which divide all the rules into a number of groups, with each rule group being assigned to a unique identifier; and wherein the decision tree data structure is used for storing a rule-group specifier which specifies each rule group that corresponds to the input packet.

The second stage of operation is based on a bit-vector lookup table data module, which is a static data store module for storing a field-segment information node lookup table module and a bit-vector lookup table cluster data module; wherein the field-segment information node lookup table module is used to define a set of field-segment information nodes associated with the rule-group specifiers retrieved from the decision-tree data module, with each field-segment information node being used to store a field-segment specifier which specifies a mapping of field segments to each rule group specified by the rule-group specifier; and wherein the bit-vector lookup table cluster data module is established by firstly organizing the rules in the rule database into a number of groups, and secondly generating a lucent bit vectors for each segment of each classification-related field in reference to each rule group.

In architecture, the two-stage computer network packet classification system of the invention comprises: (A) a decision-tree data module; (B) a bit-vector lookup table data module; (C) a first-stage processing module; and (D) a second-stage processing module.

The two-stage computer network packet classification method and system according to the invention is more advantageous to use than the prior art particularly in that the invention allows the packet classification to be implemented with low memory requirement and enhanced performance.

BRIEF DESCRIPTION OF DRAWINGS

The invention can be more fully understood by reading the following detailed description of the preferred embodiments, with reference made to the accompanying drawings, wherein:

FIG. 1 is a schematic diagram showing the application of the two-stage computer network packet classification system of the invention;

FIG. 2 is a table showing an example of a rule database used for packet classification;

FIG. 3 is a schematic diagram showing the I/O functional model of the two-stage computer network packet classification system of the invention;

DETAILED DESCRIPTION OF PREFERRED EMBODIMENTS

Figure 4:
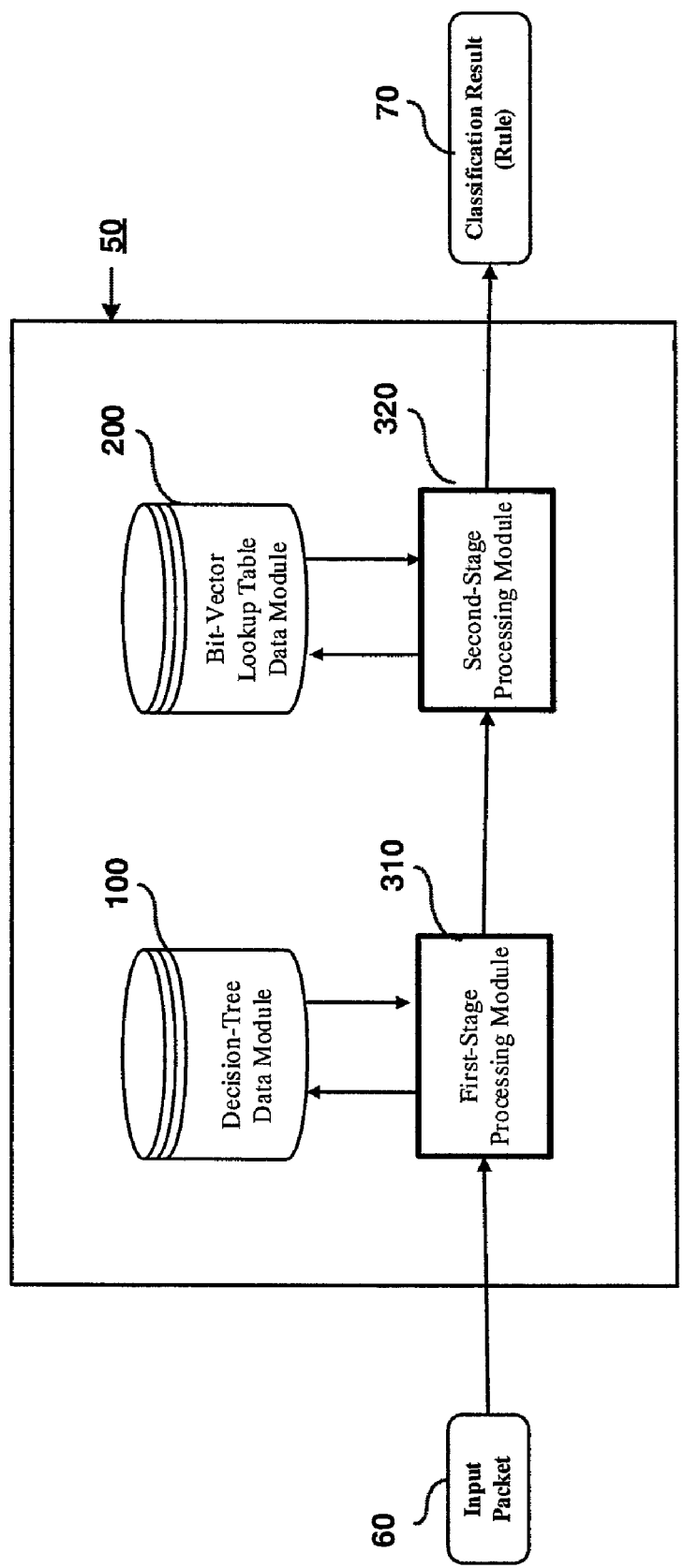
FIG. 4 is a schematic diagram showing the architecture of the two-stage computer network packet classification system of the invention.

The two-stage computer network packet classification method and system according to the invention is disclosed in full details by way of preferred embodiments in the following with reference to the accompanying drawings.

Application of the Invention

FIG. 1 is a schematic diagram showing the application of the two-stage computer network packet classification system according to the invention (which is here encapsulated in a box indicated by the reference numeral 50). As shown, the two-stage computer network packet classification system of the invention 50 is designed for use with a network data processing unit 20, such as a server, a network workstation, a router, or a firewall, that is linked between a computer unit 30 (such as a server or a network workstation) and a network system 10. In practical applications, for example, the network system 10 is a TCP/IP (Transmission Control Protocol/Internet Protocol) compliant network system, such as the Internet, an intranet, an extranet, or a LAN (Local Area Network).

Function of the Invention

In practical applications, the network management personnel needs to first use the computer unit 30 to build a rule database 40 which specifies a set of rules corresponding to specific field values in the header of the input packet 60. FIG. 2 shows an example of the rule database 40 which is devised for the classification of IPv4 (Internet Protocol Version 4) compliant packets based on a number of header fields, such as 4 header fields: [SOURCE IP ADDRESS], [DESTINATION IP ADDRESS], [SOURCE PORT], and [DESTINATION PORT], whose values are user-predefined to be mapped to one or more rules in a set of N rules {R(0), R(1), R(2), . . . , R(N−1)}. However, it is to be noted that the invention is not limited to the application for IPv4-compliant packet classification, and can also be used for IPv6 (Internet Protocol Version 6) compliant packets. Moreover, the number of header fields that are referenced for packet classification is not limited to 4, and can be 1, 2, 3, 5, or more (i.e., can be any number) depending on actual application requirements.

FIG. 3 shows the I/O (input/output) functional model of the two-stage computer network packet classification system of the invention 50. As shown, during actual operation of the network data processing unit 20, it will continually receive network data packets from the network system 10 or the computer unit 30. Each time an input packet 60 is received, the two-stage computer network packet classification system of the invention 50 is activated to perform a packet classification process on the input packet 60 by first reading the header of the rule database 40 for the value of each classification-related field, for example the following 4 header fields: [SOURCE IP ADDRESS], [DESTINATION IP ADDRESS], [SOURCE PORT], and [DESTINATION PORT]. If the values of these header fields are matched to a certain rule in the rule database 40, such as rule R(i), then the two-stage computer network packet classification system of the invention 50 will output the matched rule R(i) as the classification result 70, and activate the network data processing unit 20 to handle the input packet 60 in accordance with a procedure specified by the rule R(i).

Architecture of the Invention

As shown in FIG. 4, in architecture, the two-stage computer network packet classification system of the invention 50 comprises: (A) a decision-tree data module 100; (B) a bit-vector lookup table data module 200; (C) a first-stage processing module 310; and (D) a second-stage processing module 320. Firstly, the respective attributes and functions of these constituent components of the invention are described in details in the following.

Decision-Tree Data Module 100

The decision-tree data module 100 is a static data store module which is based on a decision tree data structure for defining the mapping of packet header field values to corresponding rule groups. The method for establishing the decision-tree data module 100 is described in the following with reference to FIGS. 5A-5D and FIGS. 6A-6C.

The theory and principle for establishing the decision-tree data module 100 is based on an existing technique called "HiCuts" (Hierarchical Intelligent Cuttings) disclosed in the technical paper entitled "*Packet classification using hierarchical intelligent cuttings*" authored by P. Gupta et al and published on IEEE Micro, vol. 20, no. 1, pp. 34-41, February 2000. The invention employs the fundamental concept of the HiCuts technique for establishing the decision-tree data module 100 for packet classification, but differs in that each leaf node in the decision tree data structure utilized by the invention is used for storing a corresponding rule group (which contains multiple possible rules) for the input packet 60, rather than a matched rule for the input packet 60 (for this sake, a second stage of processing is required to narrow down the decision tree search result).

Figures 5A, 5B:
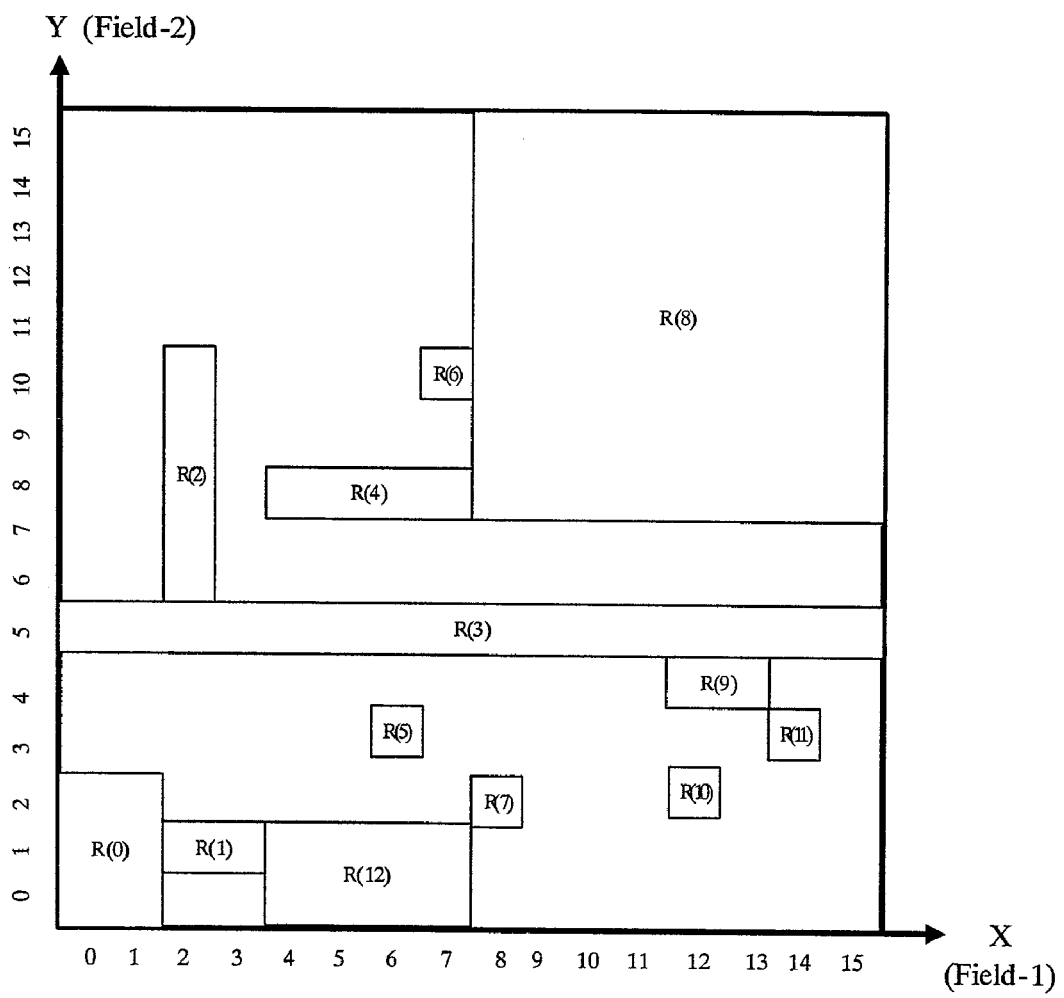
FIG. 5A is a table showing an example of a rule database.
FIG. 5B is a graph showing an example of a 2-dimensional Euclidean space for geometrical representation of the rule database shown in FIG. 5A.
Figure 5C:
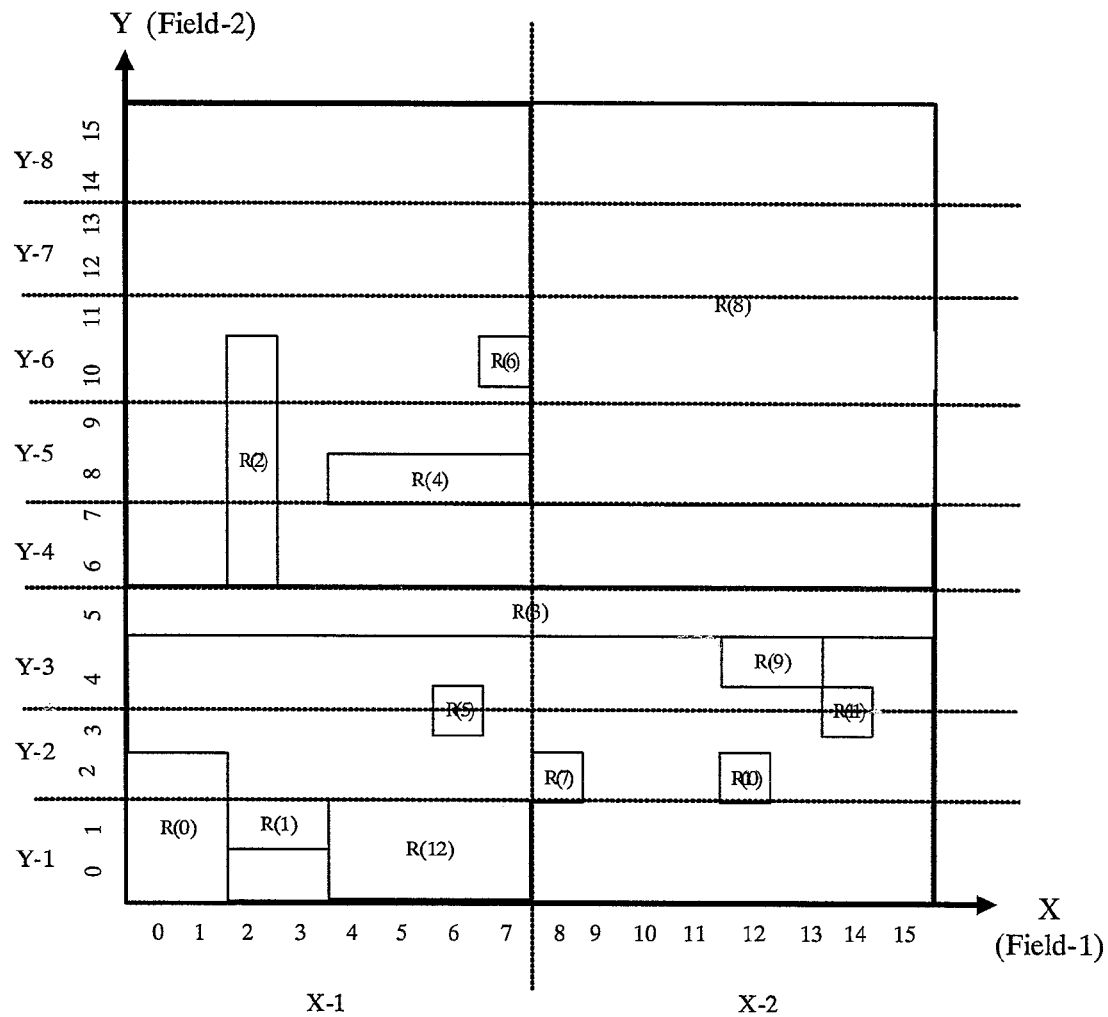
FIG. 5C is a graph showing the same rule database of FIG. 5B after performing a 2×8 cutting scheme.

The following is a brief description of the fundamental concept of the conventional HiCuts technique with reference to FIGS. 5A-5D (for details, please refer to the aforementioned paper). FIG. 5A shows an example of the rule database 40 which is used for packet classification based on two packet header fields: FIELD-1, FIELD-2, whose value range is assumed to be 0 to 15. In this rule database 40, [*] represents a don't-care value, while [0:2] represents a range from 0 to 2. This rule database 40 defines a total of 13 rules R(i), i=0 to 12. Further, FIG. 5B shows a 2-dimensional Euclidean space which refers to the header field FIELD-1 as X-axis and FIELD-2 as Y-axis for mapping all the rules R(0), R(1), R(2), ..., R(12) of the rule database 40 thereon. FIG. 4C shows an example of "cutting" the 2-dimensional Euclidean space into a plurality of regions (hereunder referred to "cut regions", which cuts the X-axis (i.e., FIELD-1) into 2 segments: X-1, X-2, and cuts the Y-axis (i.e., FIELD-2) into 8 segments: Y-1, Y-2, ..., Y-8. This 2×8 Euclidean space cutting scheme defines 16 cut regions over the 2-dimensional Euclidean space. FIG. 4D shows an example of a decision tree which is constructed based on the Euclidean space cutting scheme shown in FIG. 5C. This decision tree includes one root node 111 (represented by an oval block), a plurality of middle-level leaf nodes 112 (represented by rounded rectangles), and a plurality of bottom-level leaf nodes 113 (represented by rectangles), wherein the bottom-level leaf nodes 113 are each used for storing a corresponding rule. Based on this decision tree, the corresponding rule for the input packet 60 can be found by tracing the decision tree from the root node 111 in reference to the values of the 2 classification-related field FIELD-1 and FIELD-2 until reaching one of the bottom-level leaf nodes 113 where the corresponding rule is stored.

Figure 5D:
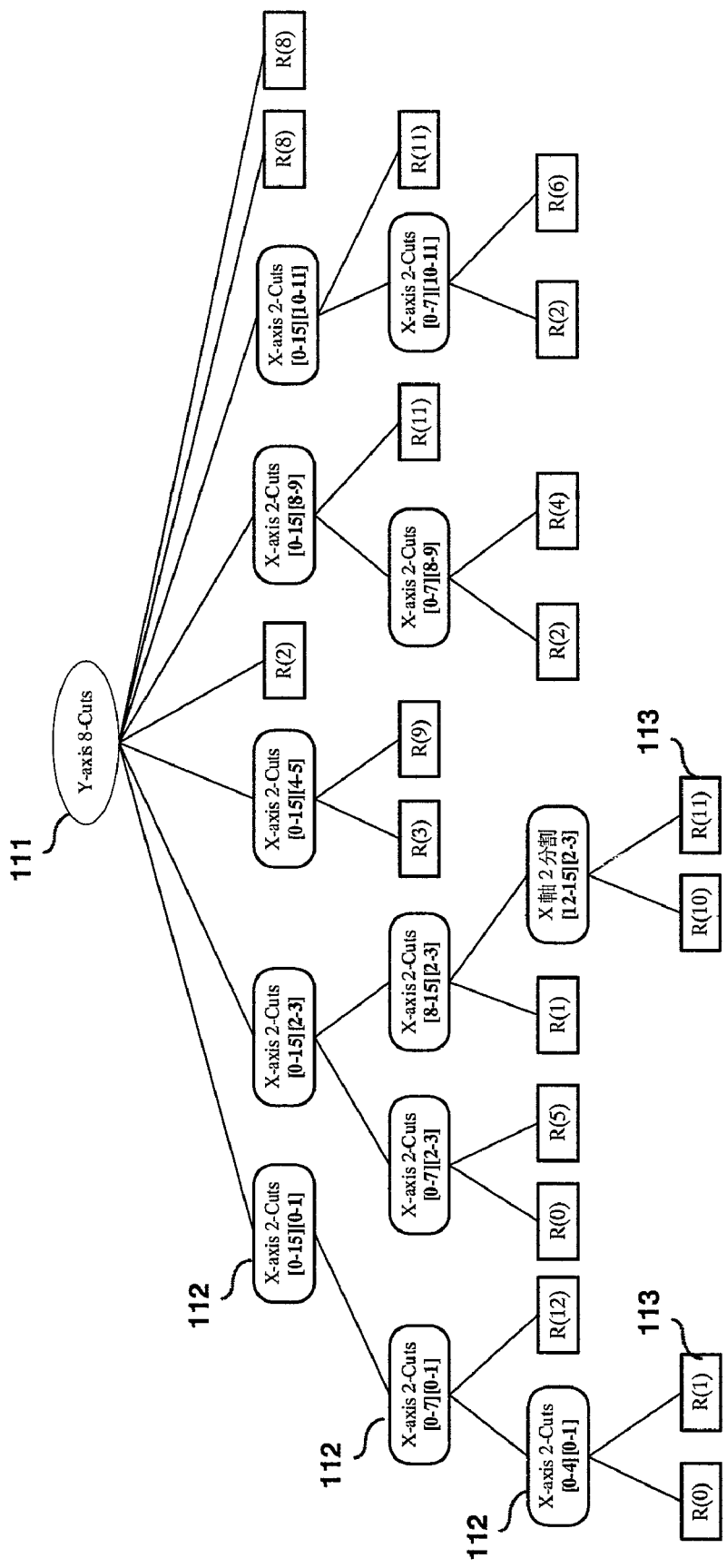
FIG. 5D is a graph showing the data structure of a decision tree constructed in accordance with the invention based on the cutting scheme on the 2-dimensional Euclidean space shown in FIG. 5C.

The decision tree shown in FIG. 5D is constructed based on the conventional HiCuts technique. The final result can be obtained through just one stage of processing. However, this decision tree shown in FIG. 5D requires quite a huge amount of data to implement. To reduce memory requirement, the invention utilizes a modified decision tree data structure and a two-stage processing scheme for finding the corresponding rule, wherein the first stage process is used to retrieve a corresponding rule group (i.e., multiple possible rules) from the modified decision tree, and the second stage process is used to find one single matched rule as the classification result 70 for the input packet 60.

The method for construction of the modified decision tree (i.e., the decision-tree data module 100) utilized by the invention is disclosed in the following with reference to FIGS. 6A-6C.

Figure 6A:
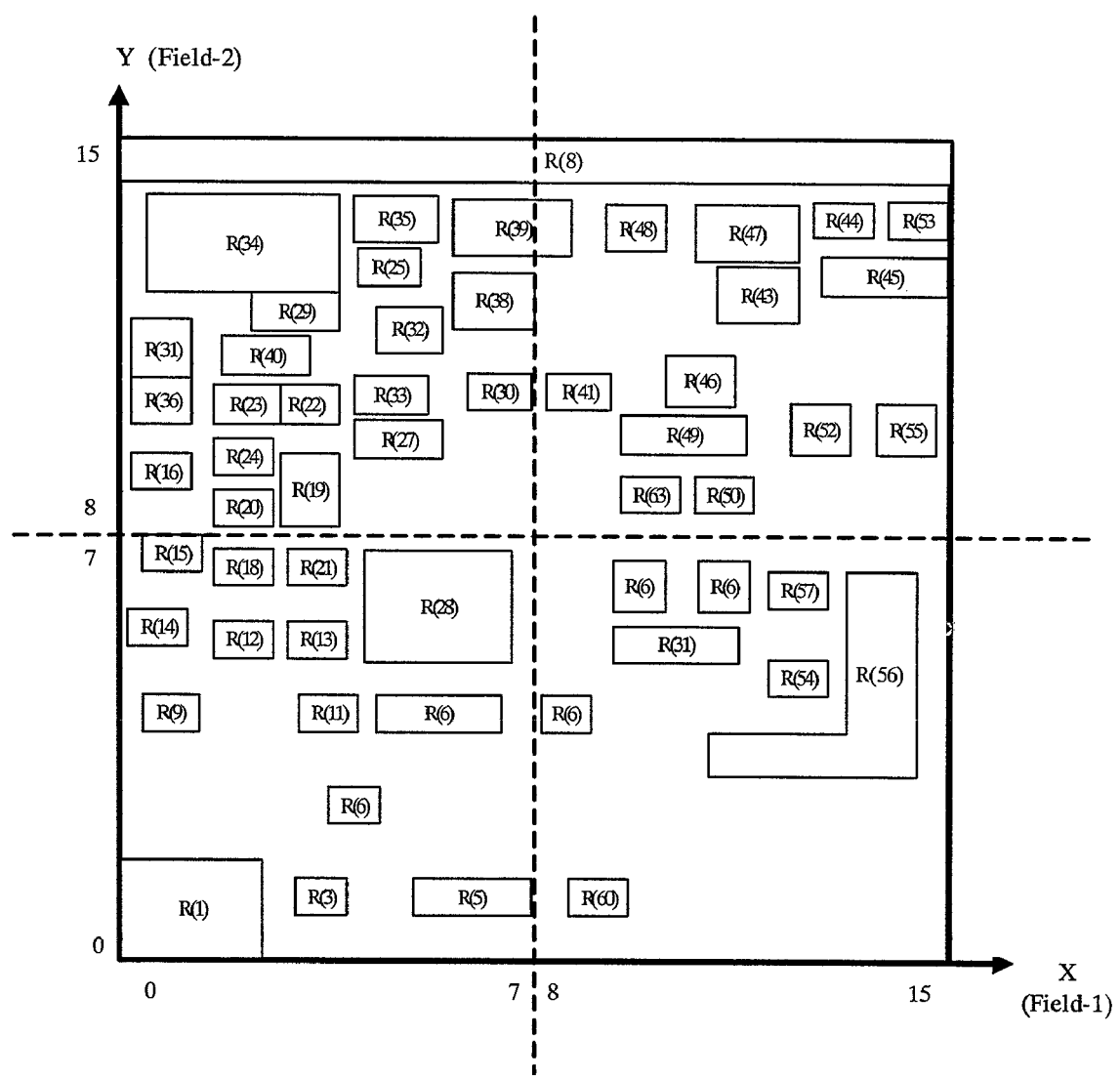
FIG. 6A is a graph showing another example of a 2-dimensional Euclidean space for geometrical representation of a rule database based on a 2×2 cutting scheme.
Figure 6B:
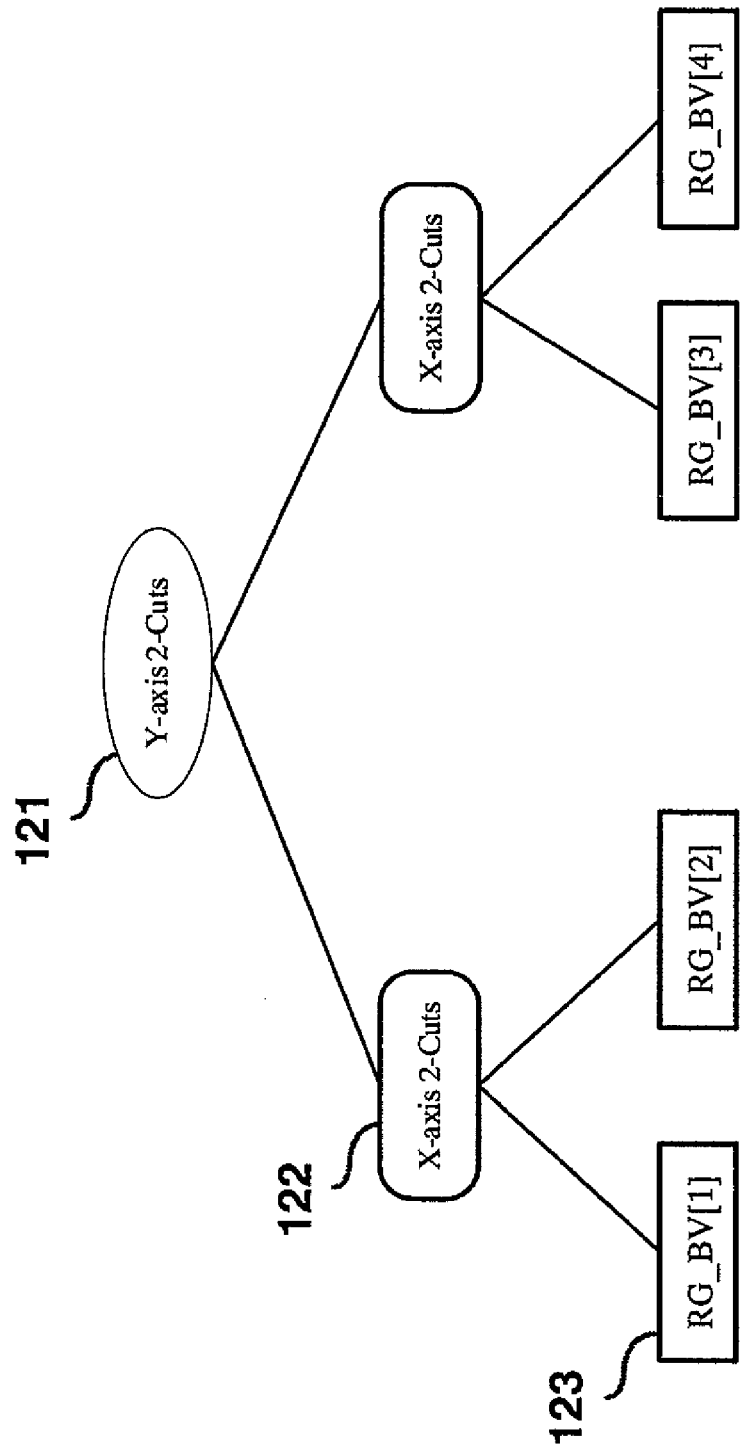
FIG. 6B is a graph showing the data structure of a decision tree constructed in accordance with the invention based on the cutting scheme on the 2-dimensional Euclidean space shown in FIG. 6A.

Assume a rule database containing N rules is mapped to a 2-dimensional Euclidean space as shown in FIG. 6A, wherein the rule database is based on two header fields FIELD-1 and FIELD-2 for packet classification, and wherein FIELD-1 is mapped to X-axis and FIELD-2 is mapped to Y-axis of the 2-dimensional Euclidean space. In accordance with the invention, the N rules of the rule database mapped to the 2-dimensional Euclidean space are divided into groups by "cutting" the 2-dimensional Euclidean space into a number of cut regions, and all the rules enclosed in each cut region are organized as a group (hereunder referred to as "rule group"). Assume M rule groups are defined, then these rule groups can be each indexed with an integer number, and thereby represented by RG(1), RG(2), ..., RG(M). In the example of FIG. 6A, the X-axis (i.e., FIELD-1) is equally cut into 2 segments and the Y-axis (i.e., FIELD-2) is equally cut into 2 segments, whereby 4 cut regions over the 2-dimensional Euclidean space are defined as shown in FIG. 6A. All the rules enclosed in each cut region are then organized into one rule group. Therefore, 4 rule groups can be obtained. Further, as shown in FIG. 6B, a decision tree can be constructed based on the cutting scheme shown in FIG. 6A, which includes a root node 121, a plurality of middle-level leaf nodes 122, and a plurality of bottom-level leaf nodes 123; wherein the bottom-level leaf nodes 123 are each used to store a rule-group specifier which specifies a corresponding rule group for the input packet 60. In practice, for example, this rule-group specifier can be implemented by using two different data types: (1) bit vector; and (2) data collection. For example, in the case of implementing with a bit vector, if the input packet 60 corresponds to two rule groups RG(7) and RG(9), then the rule-group specifier can be implemented as the bit vector: [0000 0010 1000 0000 0000], i.e., RG(7) and RG(9) are represented by setting the (7)th and (9)th bits from the left to 1. In the case of implementing with a data collection, the corresponding rule groups RG(7) and RG(9) are represented by a data collection RG_SET={7, 9}, wherein the collected number 7 represents RG(7) while 9 represents RG(9).

In the example of IPv4 packet classification, assume the classification is based on the following 4 header fields: [SA, DA, SP, DP], where SA represent source IP address, DA represent destination IP address, SP represents source port, and DP represents destination port. In this case, these 4 classification-related header fields are mapped into a 4-dimensional Euclidean space. Then, based on a 4×4×2×2 Euclidean space cutting scheme with 8 bits as a unit, the 32-bit source IP address (SA) is cut into 4 8-bit segments, the 32-bit destination IP address (DA) is cut into 4 8-bit segments, the 16-bit source port (SP) is cut into 2 8-bit segments, and the 16-bit destination port (DP) is cut into 2 8-bit segments. In the 4-dimensional Euclidean space, this cutting scheme defines 4 segments along the first dimension (SA), 4 segments along the second dimension (DA), 2 segments along the third dimension (SP), and 2 segments along the fourth dimension (DP). Therefore, a total of 4*4*2*2=64 cut regions are defined over the entire 4-dimensional Euclidean space; and a decision tree can be constructed based on this 4×4×2×2 Euclidean space cutting scheme cutting scheme, with the bottom-level leaf nodes being used to store a rule-group specifier (which can be either implemented with a bit vector or a data collection) which specify one or more possible rule groups corresponding to the input packet 60.

Bit-Vector Lookup Table Data Module 200

Figure 7:
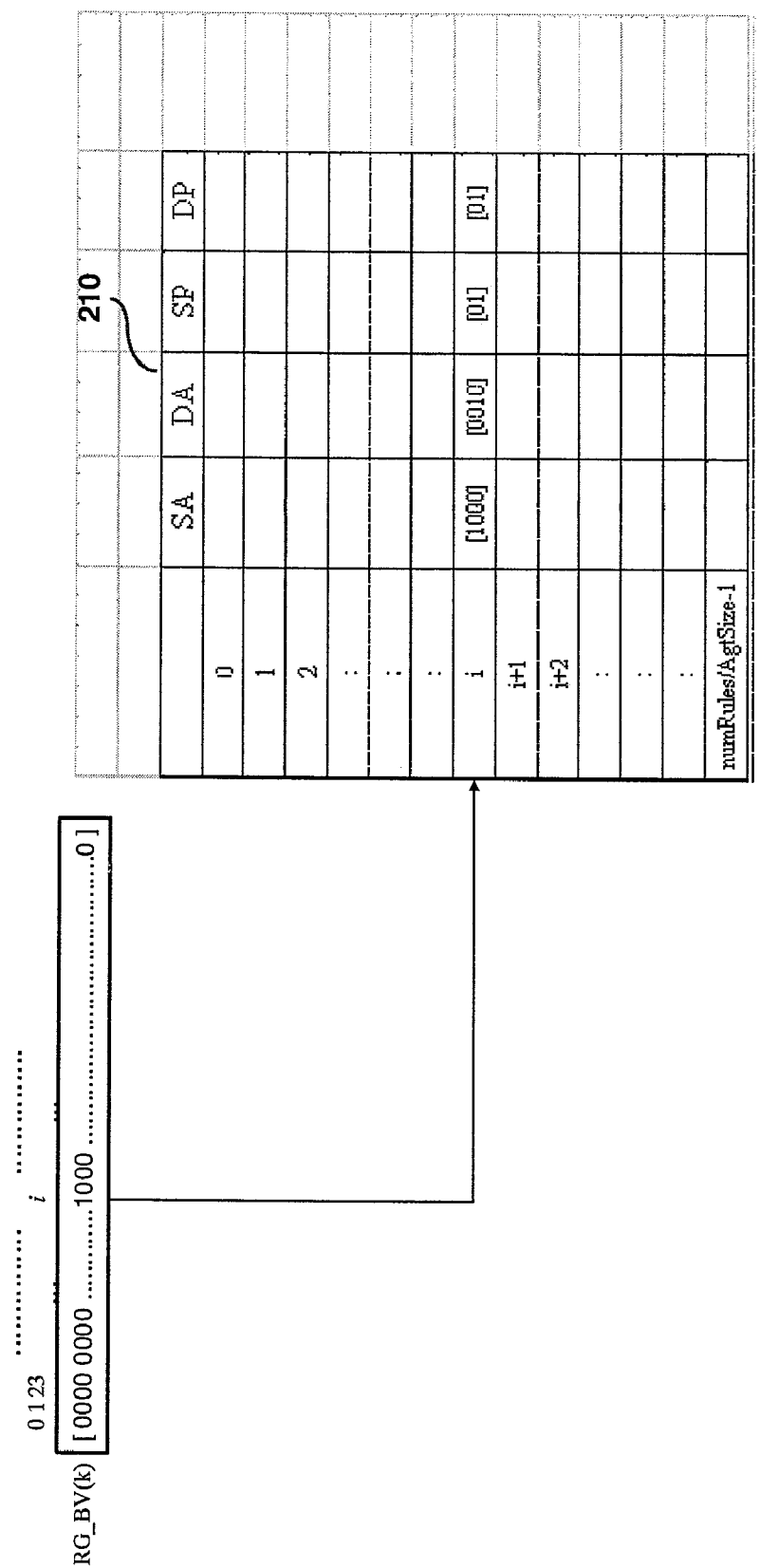
FIG. 7 is a tabular diagram showing an example of the field-segment information node lookup table module utilized by the invention for packet classification.
Figure 8:
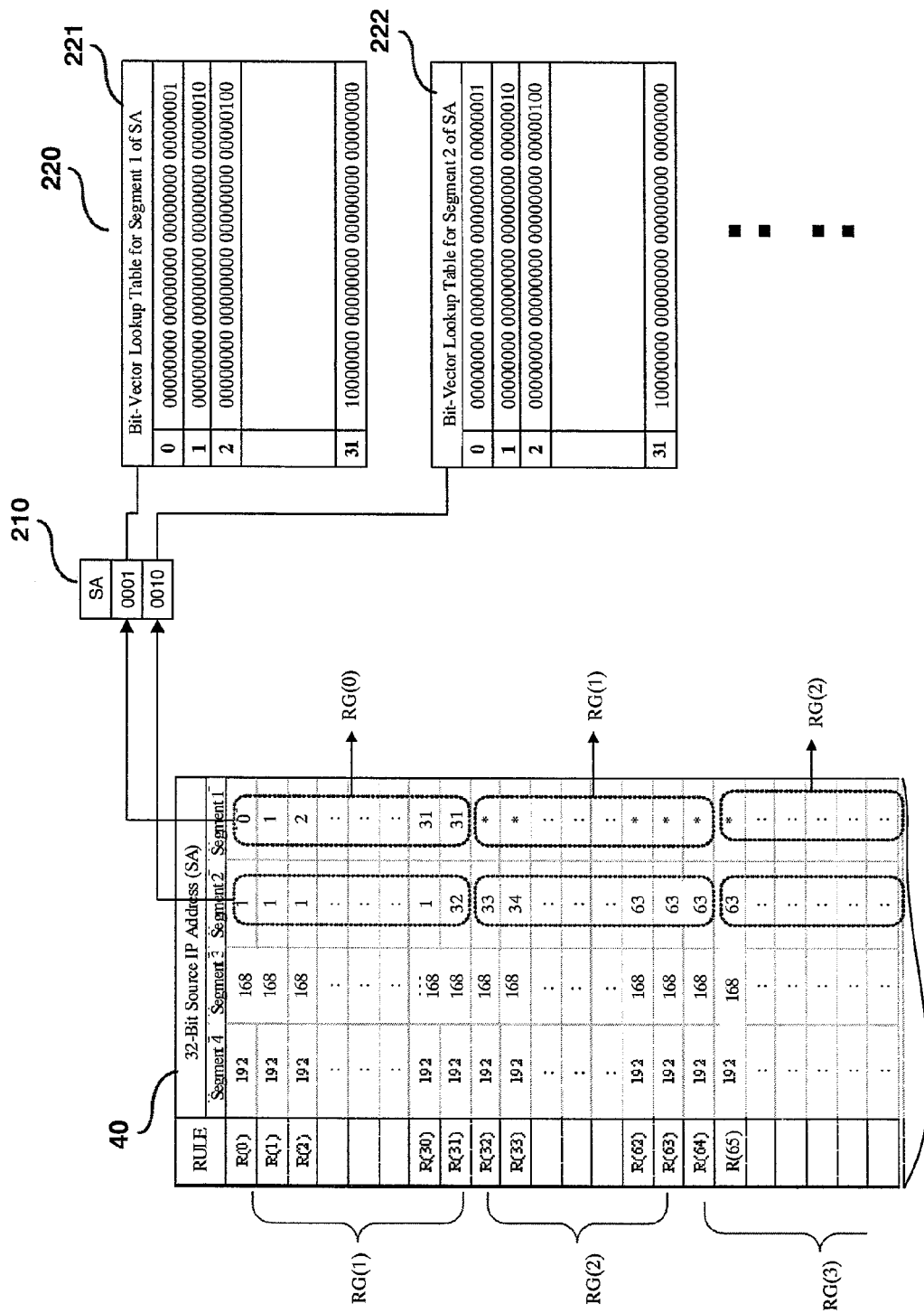
FIG. 8 is a tabular diagram showing an example of a field-segment information node lookup table module utilized by the invention for packet classification.

The bit-vector lookup table data module 200 is also a static data store module which includes a field-segment information node lookup table module 210 shown in FIG. 7 and a bit-vector lookup table cluster data module 220 shown in FIG. 8.

Referring to FIG. 7, the field-segment information node lookup table module 210 is used to define the mapping of each rule-group specifier in the decision-tree data module 100 to a corresponding field-segment information node which specifies which segments of the classification-related fields are mapped to the cut region where the specified rule group is located. For example, assume a retrieved rule-group specifier is a bit vector RG_BV(k)=[0000 0000 ... 1000 ... ], wherein the (i)th bit counting from the left is set to [1]. In this case, the bit vector RG_BV(k) indicates that the input packet 60 corresponds to the (i)th rule group RG(i). Therefore, from the field-segment information node lookup table module 210, we can retrieve the corresponding field-segment information: {[SA]=1000, [DA]=0010, [SP]=01, [DP]=01}, which indicates that, in the 4-dimensional Euclidean space, the cut region where the (i)th rule group is located is associated with the following four field segments: the (4)th segment of the first dimension [SA] since the (4)th bit from the right is 1; the (2)nd segment of the second dimension [DA] since the (2)nd bit from the right is 1; the (1)st segment of the third dimension [SP] since the (1)st bit from the right is 1; and the (1)st segment of the fourth dimension [DP] since the (1)st bit from the right is 1.

Referring next to FIG. 8, the bit-vector lookup table cluster data module 220 is constructed by organizing the N rules {R(0), R(1), R(2), . . . , R(N−1)} into a number of groups (assume a total of M groups are organized) with each group containing a fixed number of rules (represented by AgtSize). Assume these M rule groups are represented by {RG(1), RG(2), . . . RG(M)}. Then, M lucent bit vectors can be generated by mapping each segment of each classification-related field to the M rules groups.

For information about the theory and principle of the above-mentioned "lucent bit vector", readers can refer to the following technical papers: [1] "SCALABLE PACKET CLASSIFICATION USING BIT VECTOR AGGREGATING AND FOLDING", authored by Li et al); [2] "SCALABLE PACKET CLASSIFICATION" authored by Baboescu et al); and [3] "SCALABLE AND PARALLEL AGGREGATED BIT VECTOR PACKET CLASSIFICATION USING PREFIX COMPUTATION MODEL". Conventionally, the lucent bit vector technique is used to define one bit vector for each classification-related field with reference to all the N rules in the rule database 40; and therefore, each lucent bit vector contains N bits, with each bit corresponding to one rule. By the invention, however, the N rules in the rule database 40 are organized into M groups, and a lucent bit vector is generated for each rule group. Therefore, a total of M bit vectors can be generated, which are used collectively to construct the bit-vector lookup table cluster data module 220.

Referring to FIG. 8, taking the source IP address (SA) as example, we can for example choose AgtSize=32. In this case, the first 8-bit segment of the source IP address (SA) is mapped to all the 32 rules in each rule group to thereby generate a lucent bit vector, in which the position of the bit [1] indicates the corresponding rule; i.e., if the (i)th bit from the left is set to 1, it indicates that the (i)th rule is a matched rule. All the 32 bit vectors are then collected as a first bit-vector lookup table 221. In a similar manner, the second 8-bit segment of the source IP address (SA) is mapped to a second bit-vector lookup table 222; and so forth for the third and fourth segments of the source IP address (SA). Further, we can utilize the aforementioned field-segment information node lookup table module 210 for defining the mapping of the field-segments to the bit-vector lookup tables. Each field-segment information node contains 4 specifiers: [SA, DA, SP, DP], whose values are set in such a manner that if a bit-vector lookup table is associated with the (1)st segment of the source IP address (SA), the corresponding specifier SA in the information node is set to [0001]; if associated with the (2)nd segment, the corresponding specifier SA is set to [0010]; if associated with the (3)rd segment, the corresponding specifier SA is set to [0100]; and if associated with the (4)th segment, the corresponding specifier SA is set to [1000].

First-Stage Processing Module 310

The first-stage processing module 310 is used to perform a decision tree search process on the decision-tree data module 100 for the input packet 60. The first step is to read the value of each classification-related field of the input packet 60, and use each field value as a key to search through the decision-tree data module 100 for the corresponding rule-group specifier (which can be either implemented with a bit vector or a data collection). In this embodiment, assume the rule-group specifier is implemented with a bit vector RG_BV(k). The first-stage processing module 310 then transfers the retrieved bit vector RG_BV(k) to the second-stage processing module 320 for further processing.

Second-Stage Processing Module 320

The second-stage processing module 320 is capable of process the rule-group bit vector RG_BV(k) furnished by the first-stage processing module 310 for obtaining one single rule as the classification result 70 for the input packet 60. To achieve this purpose, the second-stage processing module 320 performs a series of operational steps (S21)-(S26) as shown in the flow diagram of FIG. 10.

In the first step (S21), the first-stage processing module 310 utilizes the bit value of rule-group bit vector RG_BV(k) for determine which information node in the field-segment information node lookup table module 210 is associated with the input packet 60. The operation is schematically illustrated in FIG. 7, which shows that if the (i)th bit counting from left is 1, then the (i)th information node in the field-segment information node lookup table module 210 is retrieved. In the example of FIG. 7, the (i)th information node contains the data: {[SA]=1000, [DA]=0010, [SP]=01, [DP]=01}.

Figure 9:
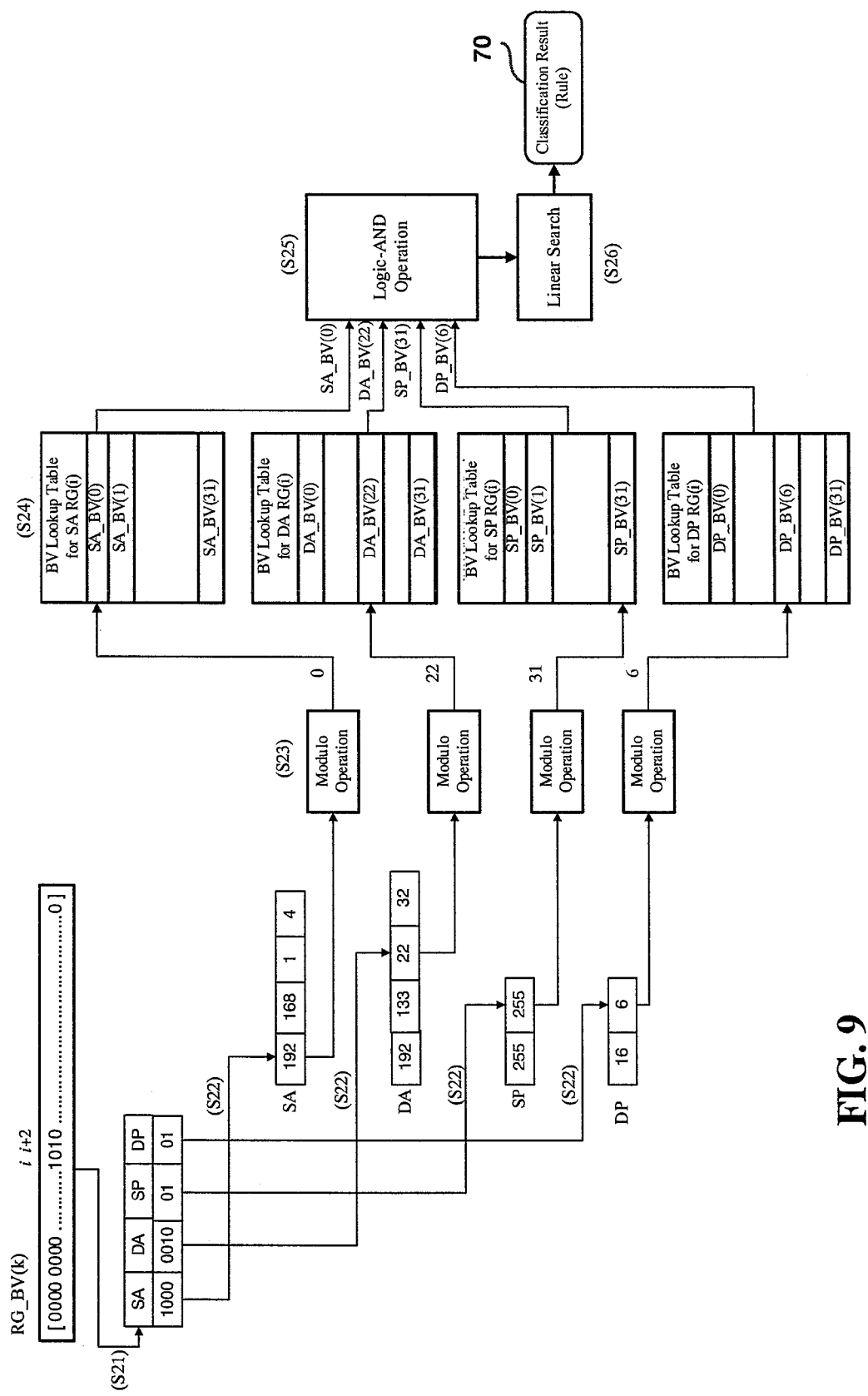
FIG. 9 is a data flow diagram showing an example of the data flow during the operation of the invention.

In the second step (S22), using the retrieved field-segment information node as a guide, the first-stage processing module 310 reads the input packet 60 for the value of each field segment specified by the field-segment information node. The operation is schematically depicted in FIG. 9. In this example, since {[SA]=1000, [DA]=0010, [SP]=01, [DP]=01}, which indicates that the input packet 60 is mapped to a cut region in the 4-dimensional Euclidean space defined by the following four field segments: the (4)th segment of the source IP address (SA), the (2)nd segment of the destination IP address (DA), the (1)st segment of the source port (SP), and the (1)st segment of the destination port (DP). Assume the input packet 60 contains the following field values: SA= [192.168.1.4], DA=[192.133.22.32], SP=[255.255], DP= [16.6], then in this case, the (4)th segment [192] in SA, the (2)nd segment [22] in DA, the (1)st segment [255] in SP, and the (1)st segment [6] in DP are extracted. This results in a set of field-segment values {[192]. [22], [255], [6]}.

In the third step (S23), a modulo operation is performed on each of the field-segment values {[192]. [22], [255], [6]}, as follows:

$$F(x)=x \bmod \text{AgtSize}$$

where x represents each field segment value.

In this example, since AgtSize=32, the above modulo operation results in the following set of values: {[0], [22], [31], [6]}.

In the fourth step (S24), the remainder values resulted from the modulo operation, i.e., {[0], [22], [31], [6]} are respectively used as a lookup key for retrieving a corresponding bit vector from the bit-vector lookup table cluster data module 220. This operation is schematically depicted in FIG. 9. In this example, the first lookup key [0] is associated with SA, and therefore the lookup is performed on the SA-related bit-vector lookup table, whereby the bit vector with the index [0], i.e., SA_BV(0) is retrieved; the second lookup key [22] is associated with DA, and therefore the lookup is performed on the DA-related bit-vector lookup table, whereby the bit vector with the index [22], i.e., DA_BV(22) is retrieved; the third lookup key [31] is associated with SP, and therefore the lookup is performed on the SP-related bit-vector lookup table, whereby the bit vector with the index [31], i.e., SP_BV (31) is retrieved; and the fourth lookup key [6] is associated with DP, and therefore the lookup is performed on the DP-related bit-vector lookup table, whereby the bit vector with the index [6], i.e., DP_BV(6) is retrieved.

In the fifth step (S25), an intersection operation is performed on the multiple bit vectors obtained by the step (S24) to find a matched rule for the input packet 60. The intersection operation can be implemented with a logic-AND operation in a bitwise manner on the bit vectors. In the event that the result includes two or more matched rules, the procedure jumps to the step (S26).

In the step (S26), a linear search process is performed on the multiple matched rules obtained by the step (S25) to find one single rule that has the highest priority, and then output this highest-priority rule as the classification result 70.

Operation of the Invention

The following is a detailed description of a practical application example of the two-stage computer network packet classification system of the invention 50 during actual operation. In this application example, it is assumed that the packet classification is based on 4 header fields [SOURCE IP ADDRESS], [DESTINATION IP ADDRESS], [SOURCE PORT], and [DESTINATION PORT] of the input packet 60, and it is further assumed that the values of these 4 header fields are {[192.168.1.4], [192.133.22.32], [65536], [4102]}.

During the first-stage operation, the first-stage processing module 310 is activated to read the input packet 60 for the respective values of the four classification-related fields, and then use these field values as a key to search through the decision-tree data module 100 for finding the corresponding rule-group specifier. Assume the corresponding rule-group specifier is a bit vector RG_BV(k). This completes the first-stage operation.

Figure 10:
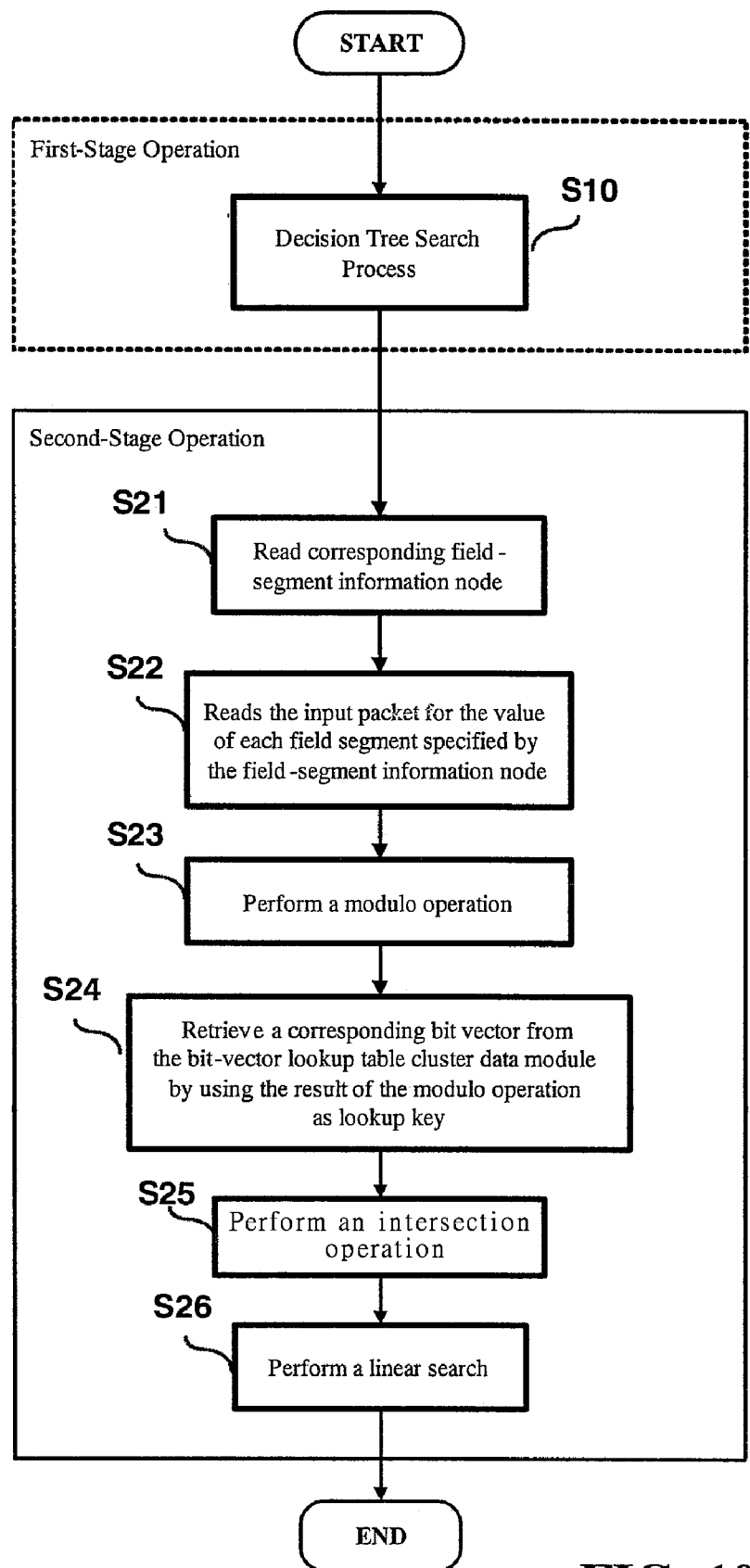
FIG. 10 is a flow diagram showing the procedural steps performed by the invention for packet classification.

Next, during the second-stage operation, the second-stage processing module 320 is activated to firstly perform the step (S21) shown in the flow diagram of FIG. 10. In this step (S21), the first-stage processing module 310 parses through the bit vector RG_BV(k) to find the position of each bit 1 therein. Assume the (i)th bit from the left is 1, then corresponding (i)th information node is retrieved from the field-segment information node lookup table module 210.

Assume the retrieved (i)th information node contains the values: [SA, DA, SP, DP]=[(1000), (0010), (01), (01)], which indicates that the input packet 60 is mapped to a cut region in the 4-dimensional Euclidean space that is defined by the following four field segments: the (4)th segment of the source IP address (SA), the (2)nd segment of the destination IP address (DA), the (1)st segment of the source port (SP), and the (1)st segment of the destination port (DP). Therefore, sine the 4 classification-related fields of the rule database 40 are SA=[192.168.1.4], DA=[192.133.22.32], SP=[65536], and DP=[4102]}, the (4)th segment [192] in SA, the (2)nd segment [22] in DA, the (1)st segment [255] in SP, and the (1)st segment [6] in DP are extracted. This results in a set of field-segment values {[192], [22], [255], [6]}.

Next, the second-stage processing module 320 carries out the third step (S23), wherein a modulo operation is performed on each of the field-segment values {[192], [22], [255], [6]} by dividing each of these values by AgtSize=32. Through this modulo operation, the remainder of [192] being divided by 32 is [0]; the remainder of [22] being divided by 32 is [22]; the remainder of [255] being divided by 32 is [31]; and the remainder of [6] being divided by 32 is [6]. Therefore, this modulo operation results in the following set of values: {[0], [22], [31], [6]}.

Next, the second-stage processing module 320 carries out the fourth step (S24), wherein the remainder values {[0], [22], [31], [6]} resulted from the modulo operation are respectively used as a lookup key for retrieving a corresponding bit vector from the bit-vector lookup table cluster data module 220, as depicted in FIG. 9. In this lookup operation, the first lookup key [0] is associated with SA, and therefore from the SA-related bit-vector lookup table, the bit vector with the index [0], i.e., SA_BV(0), is retrieved; the second lookup key [22] is associated with DA, and therefore from the DA-related bit-vector lookup table, the bit vector with the index [22], i.e., DA_BV(22), is retrieved; the third lookup key [31] is associated with SP, and therefore from the SP-related bit-vector lookup table, the bit vector with the index [31], i.e., SP_BV(31), is retrieved; and the fourth lookup key [6] is associated with DP, and therefore from the DP-related bit-vector lookup table, the bit vector with the index [6], i.e., DP_BV(6), is retrieved. As a consequence, this lookup operation results in the following set of bit vectors: SA_BV(0), DA_BV(22), SP_BV(31), DP_BV(6).

Next, the second-stage processing module 320 carries out the step (S25), wherein an intersection operation, which is implemented with a logic-AND operation, is performed bitwise on the 4 bit vectors SA_BV(0), DA_BV(22), SP_BV(31), and DP_BV(6) to thereby find a matched rule for the input packet 60. If the result contains only one bit 1 at a certain position, then the corresponding rule is outputted as the classification result 70. On the other hand, if the result contains two or more matched rules, the procedure jumps to the step (S26), wherein a linear search process is performed on the multiple matched rules to thereby find one single rule that has the highest priority, and then output this highest-priority rule as the classification result 70.

If no matched rule is found through the foregoing steps (S21)-(S26) and the rule-group bit vector RG_BV(k) contains another bit 1, for example at the (i+2)th bit position, then the same process is repeated again for the (i+2)th rule group to find whether it contains a matched rule. This process is repeated for every bit 1 in the RG_BV(k).

In conclusion, the invention provides a two-stage computer network packet classification method and system which is characterized by the use of a two-stage operation for packet classification; wherein the first-stage operation involves the use of a decision-tree data module whose leaf nodes are used to store a bit vector that represents a cluster of rule groups that are located within a particular cut region in a multidimensional Euclidean space that is mapped to the field values of the input packet; and the second-stage operation involves the use of a bit-vector lookup table data module to retrieve a set of bit vectors which represent a set of possible rules in each rule group and which are intersected to find a matched rule for the input packet. This feature allows the packet classification to be implemented with low memory requirement and enhanced system performance. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A two-stage computer network packet classification method for use on a network data processing unit for classification of an input packet in accordance with a predefined rule database, wherein the input packet contains a number of header fields, and wherein the rule database specifies a number of rules corresponding to particular values of the header fields of the input packet;

the two-stage computer network packet classification method comprising:

establishing a decision tree data structure, which includes one root node and a plurality of leaf nodes linked to the root node, and wherein the decision tree data structure is established by mapping the field-to-rule correspondence defined in the rule database onto an N-dimensional Euclidean space, and using a predefined Euclidean space cutting scheme to cut each classification-related header field into a number of segments which are mapped to the N-dimensional Euclidean space to define a number of cut regions which divide all the rules into a number of groups, with each rule group being assigned to a unique identifier; and wherein the decision tree is used for storing a rule-group specifier which specifies each rule group that corresponds to the input packet;

establishing a bit-vector lookup table data module, which is used for storing a field-segment information node lookup table module and a bit-vector lookup table cluster data module; wherein the field-segment information node lookup table module is used to define a set of field-segment information nodes associated with the rule-group specifiers retrieved from the decision-tree data module, with each field-segment information node being used to store a field-segment specifier which specifies a mapping of field segments to each rule group specified by the rule-group specifier; and wherein the bit-vector lookup table cluster data module is established by firstly organizing the rules in the rule database into a number of groups, and secondly generating a lucent bit vectors for each segment of each classification-related field in reference to each rule group;

during actual operation, performing a first-stage of operation, which reads the input packet for the value of each classification-related field for use as a search key for retrieving from the decision-tree data structure a corresponding rule-group specifier; and performing a second-stage of operation, which firstly uses the rule-group specifier retrieved from the decision-tree data module as a key for retrieving a corresponding field-segment information node corresponding from the field-segment information node lookup table module; secondly reads the input packet for the values of the field-segments specified by the field-segment information node; thirdly performs a modulo operation on each field-segment value to thereby obtain a set of lookup keys for inquiring the bit-vector lookup table data module for a set of bit vectors; and finally performs an intersection operation on the bit vectors to obtain a matched rule as classification result for the input packet.

2. The two-stage computer network packet classification method of claim 1, wherein the network data processing unit is a fire wall.

3. The two-stage computer network packet classification method of claim 1, wherein the network data processing unit is a router.

4. The two-stage computer network packet classification method of claim 1, wherein the network data processing unit is a network server.

5. The two-stage computer network packet classification method of claim 1, wherein the network data processing unit is a network workstation.

6. The two-stage computer network packet classification method of claim 1, wherein the rule-group specifier is implemented with a bit vector which utilizes bit positions to specify corresponding rule groups.

7. The two-stage computer network packet classification method of claim 1, wherein the rule-group specifier is implemented with a data collection which utilizes identifier numbers to specify corresponding rule groups.

8. The two-stage computer network packet classification method of claim 1, wherein in the case that the second-stage processing module finds multiple matched rules, the second-stage processing module further performs a linear search process for finding among the multiple matched rules one single rule with highest priority as classification result.

9. The two-stage computer network packet classification method of claim 1, wherein the intersection operation is a logic-AND operation.

10. The two-stage computer network packet classification method of claim 1, wherein the input packet is an IPv4 (Internet Protocol Version 4) compliant packet.

11. The two-stage computer network packet classification method of claim 1, wherein the input packet is an IPv6 (Internet Protocol Version 6) compliant packet.

12. A two-stage computer network packet classification system for integration to a network data processing unit for classification of an input packet in accordance with a predefined rule database, wherein the input packet contains a number of header fields, and wherein the rule database specifies a number of rules corresponding to particular values of the header fields of the input packet;

the two-stage computer network packet classification system comprising:

a decision-tree data module, which is a static data store module for defining a decision tree data structure, wherein the decision tree data structure includes one root node and a plurality of leaf nodes linked to the root node, and wherein the decision tree data structure is established by mapping the field-to-rule correspondence defined in the rule database onto an N-dimensional Euclidean space, and using a predefined Euclidean space cutting scheme to cut each classification-related header field into a number of segments which are mapped to the N-dimensional Euclidean space to define a number of cut regions which divide all the rules into a number of groups, with each rule group being assigned to a unique identifier; and wherein the decision tree data structure is used for storing a rule-group specifier which specifies each rule group that corresponds to the input packet;

a bit-vector lookup table data module, which is a static data store module for storing a field-segment information node lookup table module and a bit-vector lookup table cluster data module; wherein the field-segment information node lookup table module is used to define a set of field-segment information nodes associated with the rule-group specifiers retrieved from the decision-tree data module, with each field-segment information node being used to store a field-segment specifier which specifies a mapping of field segments to each rule group specified by the rule-group specifier; and wherein the bit-vector lookup table cluster data module is established by firstly organizing the rules in the rule database into a number of groups, and secondly generating a lucent bit vectors for each segment of each classification-related field in reference to each rule group;

a first-stage processing module, which is an active data processing module reading the input packet for the value of each classification-related field for use as a search key for retrieving from the decision-tree data module a corresponding rule-group specifier; and a second-stage processing module, which is an active data processing module firstly using the rule-group specifier retrieved from the decision-tree data module as a key for retrieving a corresponding field-segment information node corresponding from the field-segment information node lookup table module; secondly reading the input packet for the values of the field-segments specified by the field-segment information node; thirdly performing a modulo operation on each field-segment value to thereby obtain a set of lookup keys for inquiring the bit-vector lookup table data module for a set of bit vectors; and finally performing an intersection operation on the bit vectors to obtain a matched rule as classification result for the input packet.

13. The two-stage computer network packet classification system of claim 12, wherein the network data processing unit is a fire wall.

14. The two-stage computer network packet classification system of claim 12, wherein the network data processing unit is a router.

15. The two-stage computer network packet classification system of claim 12, wherein the network data processing unit is a network server.

16. The two-stage computer network packet classification system of claim 12, wherein the network data processing unit is a network workstation.

17. The two-stage computer network packet classification system of claim 12, wherein the rule-group specifier is implemented with a bit vector which utilizes bit positions to specify corresponding rule groups.

18. The two-stage computer network packet classification system of claim 12, wherein the rule-group specifier is implemented with a data collection which utilizes identifier numbers to specify corresponding rule groups.

19. The two-stage computer network packet classification system of claim 12, wherein in the case that the second-stage processing module finds multiple matched rules, the second-stage processing module further performs a linear search process for finding among the multiple matched rules one single rule with highest priority as classification result.

20. The two-stage computer network packet classification system of claim 12, wherein the intersection operation is a logic-AND operation.

21. The two-stage computer network packet classification system of claim 12, wherein the input packet is an IPv4 (Internet Protocol Version 4) compliant packet.

22. The two-stage computer network packet classification system of claim 12, wherein the input packet is an IPv6 (Internet Protocol Version 6) compliant packet.

* * * * *